（12）United States Patent
Frazier et al.

(10) Patent No.: US 9,043,509 B2
(45) Date of Patent: May 26, 2015

(54) METHOD AND SYSTEM FOR LOW-LATENCY NETWORKING

(75) Inventors: Howard Frazier, Pleasanton, CA (US); Yongbum Kim, Los Altos Hills, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/108,524

(22) Filed: May 16, 2011

(65) Prior Publication Data

US 2012/0182892 A1    Jul. 19, 2012

Related U.S. Application Data

(60) Provisional application No. 61/452,593, filed on Mar. 14, 2011, provisional application No. 61/432,967, filed on Jan. 14, 2011.

(51) Int. Cl.
*G06F 3/00* (2006.01)
*H04L 12/805* (2013.01)
*H04L 12/851* (2013.01)
(Continued)

(52) U.S. Cl.
CPC ............ *H04L 47/365* (2013.01); *G06F 13/385* (2013.01); *G06F 3/0613* (2013.01); *G06F 3/0659* (2013.01); *G06F 3/067* (2013.01); *H04L 47/2425* (2013.01); *H04L 47/283* (2013.01);
(Continued)

(58) Field of Classification Search
CPC ... G06F 13/161; G06F 13/385; G06F 3/0613; G06F 3/067; G06F 3/0659; H04L 47/10; H04L 47/25; H04L 1/0002

USPC ............ 710/60, 29, 30, 33, 34; 370/232, 233, 370/253
See application file for complete search history.

(56) References Cited

U.S. PATENT DOCUMENTS 6,252,855 B1    6/2001  Langley
6,473,814 B1 *  10/2002 Lyons et al. .................... 710/35
(Continued)

FOREIGN PATENT DOCUMENTS

EP    1372304 A2    12/2003
WO    03036499 A1    5/2003

OTHER PUBLICATIONS

European search report in the copending European application 11010285.2, mailed Mar. 30, 2012.
(Continued)

*Primary Examiner* — Ernest Unelus
(74) *Attorney, Agent, or Firm* — Oblon, McClelland, Maier & Neustadt, L.L.P.

(57) ABSTRACT

Various aspects of a method and system for low-latency networking are provided. Latency requirements of traffic to be communicated along a network path comprising one or more Ethernet links may be determined. A maximum size of Ethernet frames utilized for communicating the traffic may be determined based on the latency requirements. The maximum size of the Ethernet frames may be determined based on a data rate of one or more Ethernet links along the network path. A single device may utilize different maximum packet sizes for different ports/links on which it communicates. One or more messages indicating the determined maximum size may be communicated among devices along the network path to coordinate maximum packet sizes.

17 Claims, 6 Drawing Sheets

(51) Int. Cl.
*H04L 12/841* (2013.01)
*G06F 13/38* (2006.01)
*G06F 3/06* (2006.01)
*H04L 12/40* (2006.01)

(52) U.S. Cl.
CPC ............... *H04L 2012/4026* (2013.01); *H04L 2012/40267* (2013.01)

(56) References Cited

U.S. PATENT DOCUMENTS

| | | | |
|---|---|---|---|
| 6,542,941 B1 * | 4/2003 | Simpson, III | 710/30 |
| 7,206,866 B2 * | 4/2007 | Hendel et al. | 710/6 |
| 8,073,994 B2 * | 12/2011 | Roberts et al. | 710/52 |
| 8,103,809 B1 * | 1/2012 | Michels et al. | 710/22 |
| 8,214,553 B2 * | 7/2012 | Srinivasan | 710/22 |
| 8,493,859 B2 * | 7/2013 | Elliot et al. | 370/235 |
| 2005/0038946 A1 * | 2/2005 | Borden | 710/310 |
| 2007/0009015 A1 * | 1/2007 | Kunii et al. | 375/219 |
| 2008/0298391 A1 * | 12/2008 | Feroz et al. | 370/468 |
| 2011/0145433 A1 * | 6/2011 | Noel et al. | 709/232 |
| 2011/0261691 A1 * | 10/2011 | Jin et al. | 370/230 |

OTHER PUBLICATIONS

Korean Office Action in the copending Korean application 10-2012-0002912, mailed Apr. 25, 2013.

* cited by examiner

METHOD AND SYSTEM FOR LOW-LATENCY NETWORKING

CLAIM OF PRIORITY

This application makes reference to, claims priority to, and claims the benefit of U.S. Provisional Application Ser. No. 61/432,967, filed on Jan. 14, 2011. This application also makes reference to, claims priority to, and claims the benefit of U.S. Provisional Application Ser. No. 61/452,593, filed on Mar. 14, 2011.

The above stated application is hereby incorporated herein by reference in its entirety.

FIELD OF THE INVENTION

Certain embodiments of the invention relate to networking. More specifically, certain embodiments of the invention relate to a method and system for low-latency networking.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including the Internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new networking technologies.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for low-latency networking, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for low-latency networking. In various embodiments of the invention, latency requirements of traffic to be communicated along a network path comprising one or more Ethernet links may be determined. A maximum size of Ethernet frames utilized for communicating the traffic may be determined based on the latency requirements. One or more messages indicating the determined maximum size may be communicated to devices along the network path. The maximum size of the Ethernet frames may be determined based on a data rate of one or more Ethernet links along the network path. The maximum size of the Ethernet frames may be determined to be a first, smaller value when the traffic pertains to automobile control and/or safety systems. The maximum size of the Ethernet frames may be determined to be a second, higher value when the traffic is non-critical; for example, when it does not pertain to control and/or safety in an automotive or industrial setting. A network device may begin communicating the traffic upon receiving an indication that each of the devices along the network path will adhere to the determined maximum Ethernet frame size for communications on the network path. The network device may communicate with the devices along the network path to reserve resources for communicating the traffic along the network path in Ethernet frames of the determined maximum size.

In various embodiments of the invention, a network device may receive an indication of a determined maximum Ethernet frame size to be utilized on a particular network path. One or more portions of the network device may be configured such that the network device adheres to the determined maximum Ethernet frame size when transmitting on the network path. The network device may packetize traffic to be communicated on the network path into Ethernet frames of less than or equal to the determined maximum Ethernet frame size. The network device may send one or more messages indicating that it will adhere to the determined maximum Ethernet frame size when communicating on the network path. The determined maximum Ethernet frame size may be based on latency requirements of traffic to be communicated on the network path. The maximum size of the Ethernet frames may be based on a data rate associated with one or more links of the network path.

Figure 1:
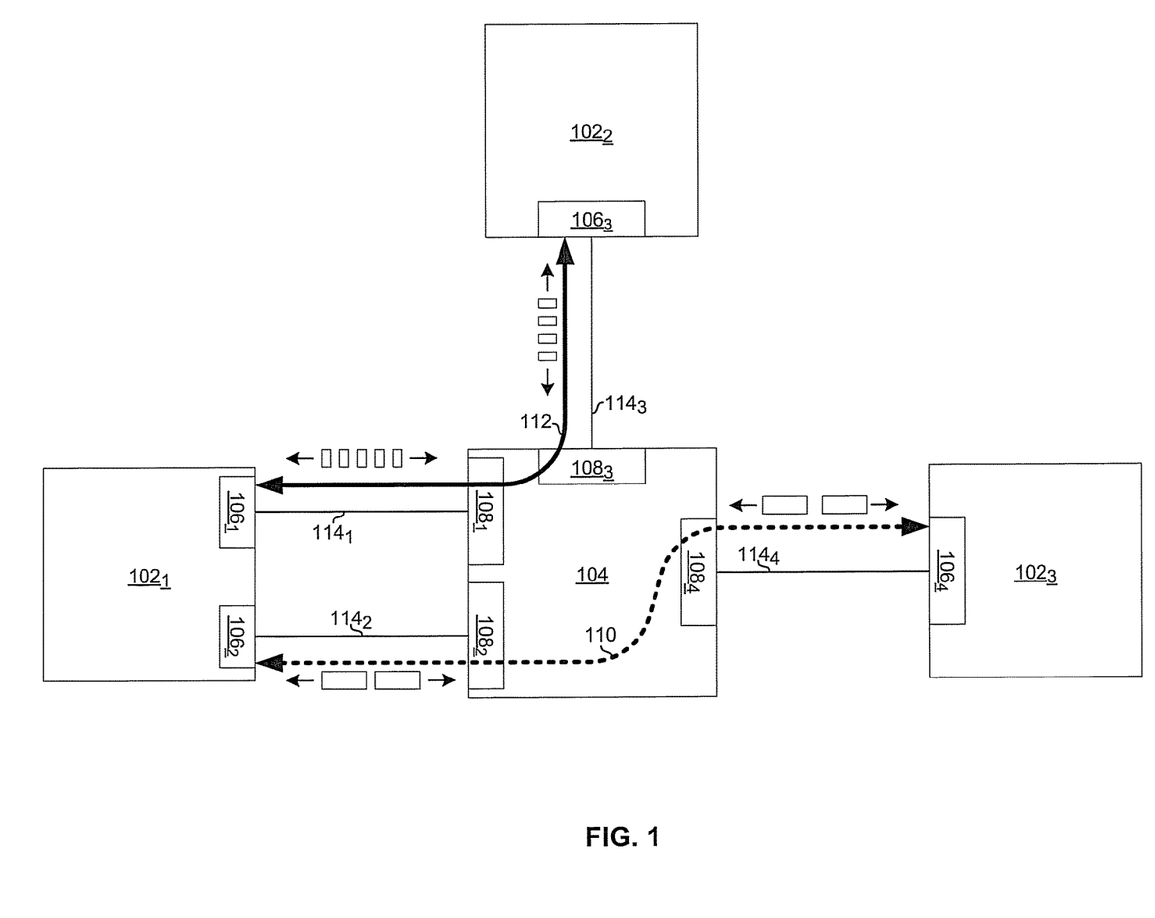
FIG. 1 is a diagram illustrating an exemplary Ethernet network, in accordance with an embodiment of the invention.

FIG. 1 is a diagram illustrating an exemplary Ethernet network, in accordance with an embodiment of the invention. Referring to FIG. 1, there is shown network devices $102_1$-$102_3$ and network device 104. The network device $102_1$ is coupled to the network device 104 via network links $114_1$ and $114_2$. The network device $102_2$ is coupled to the network device 104 via a network link $114_3$. The network device $102_3$ is coupled to the network device 104 via a network link $114_4$.

The network device 104 may be as described below with respect to FIG. 2. The network devices $102_1$-$102_3$ may each be as described below with respect to FIG. 3. Each of the links $114_1$-$114_N$ may comprise, for example, one or more twisted pair cables, one or more fiber optic cables, backplane, and one or more wireless links.

The use of Ethernet and associated Ethernet switching (e.g., IEEE 802.1 Bridging), augmentation for Time-Sync (e.g., IEEE 802.1AS), reservation (e.g., IEEE 802.1Qat), and related Audio Video Bridging standards, by one or more of the network devices $102_1$-$102_3$ and 104 may make those devices suitable for use in control system applications with stringent time-sensitive messaging requirements. For example, the devices $102_1$-$102_3$ and 104 may be utilized in industrial automation and control and/or automotive control and/or safety applications.

In operation, the devices $102_1$-$102_3$ and 104 may exchange packetized information over the links $114_1$-$114_4$. The communications may, for example, be in adherence with one or more Ethernet physical layer standards. The communications may comprise, for example, communication of data packetized in accordance with Ethernet standards. Latency of a network link may be influenced by the maximum size of messages transmitted on that link, because transmission of a first message may need to complete before a second message can be transmitted. The larger the first message, the longer the second message may have to wait.

Accordingly, aspects of the invention may enable controlling a maximum size of messages (e.g., Ethernet frames) communicated over the links $114_1$-$114_4$ may be determined on a per-link basis. Additionally or alternatively, a maximum size of messages communicated over the links $114_1$-$114_4$ may be determined or a per path basis. Exemplary paths 110 and 112 are shown in FIG. 1. Exemplary path 110 comprises device $102_1$, port subsystem $106_2$, link $114_2$, device 104, port subsystems $108_2$ and $108_4$, link $114_4$, device $102_3$, and port subsystem $106_4$. Exemplary path 112 comprises device $102_1$, port subsystem $106_1$, link $114_1$, device 104, port subsystems $108_1$ and $108_3$, link $114_3$, device $102_2$, and port subsystem $106_3$.

The maximum message size for a particular path may be determined based on, for example, link speeds along the path. For example, if there is one or more lower-speed links along the path, a correspondingly smaller maximum message size may be utilized for that path. Conversely, if all the links along a path are higher-speed, a correspondingly larger maximum message size may be utilized for that path.

The maximum message size for a particular path may be determined based on, for example, latency requirements of traffic to be communicated over the path. For example, if a path is to carry traffic requiring low latency, a correspondingly smaller maximum message size may be utilized for that path. Conversely, if a path is to carry traffic that is tolerant of higher latency, a correspondingly larger maximum message size may be utilized for that path.

One example of low-latency traffic is sensor and/or control information pertaining to a vehicle's control and/or safety systems. Examples of such traffic may include messages to control and/or diagnose components of the powertrain, messages to control and/or diagnose steering systems, messages to control and/or diagnose breaking systems, and messages to control and/or diagnose airbags. Another example of low-latency traffic is control and/or safety information in an automated factory. Examples of such traffic may include messages to diagnose conditions along an automated assembly line, and messages to control machines which are part of an automated assembly line.

Exemplary less-latency-sensitive traffic may comprise multimedia information being communicated to and/or from a vehicle entertainment system and or non-time-sensitive reporting of data in a factory.

Latency requirements of traffic may be determined based on, for example, inspection of the traffic, based on a port or socket via which the traffic is being communicated to a networking port subsystem 106 or 108, and/or based on a program generating or otherwise associated with the traffic. In an embodiment of the invention, higher-OSI-layer applications or entities may tag or mark data based on its latency requirements, and lower-OSI-layer functions and/or entities may inspect the traffic to detect the tag/mark to determine the latency requirements of the data. In an embodiment of the invention, latency requirements associated with various traffic characteristics may be stored in a look-up table. One such characteristic may comprise the type of traffic. Exemplary traffic types which may be associated with particular latency requirements comprise general web traffic, email traffic, multimedia traffic, and vehicle sensory and/or control traffic. Another exemplary characteristic may comprise the port, socket, and/or programs associated with traffic. Another exemplary characteristic may comprise network devices or network addresses. The look-up table may be populated by a network administrator and/or may be dynamically populated via, for example, LLDP, SNMP, and/or AVB-related messages.

The maximum message size for a particular path may be determined based on, for example, whether devices that are part of the path perform critical functions. For example, the device $102_1$ may comprise a central computing system of a vehicle, the device $102_2$ may comprise a control, sensor, and/or safety system of the vehicle, and the device $102_3$ may comprise an entertainment system of the vehicle. The devices $102_1$ and $102_2$ may exchange critical sensor, control, and/or safety information which may require low latency. Accordingly, a small maximum message size may be utilized on the path 112. The devices $102_1$ and $102_3$ may exchange audio and/or video which may tolerate higher latency. Accordingly, a larger maximum message size may be utilized on the path 110.

Figure 2:
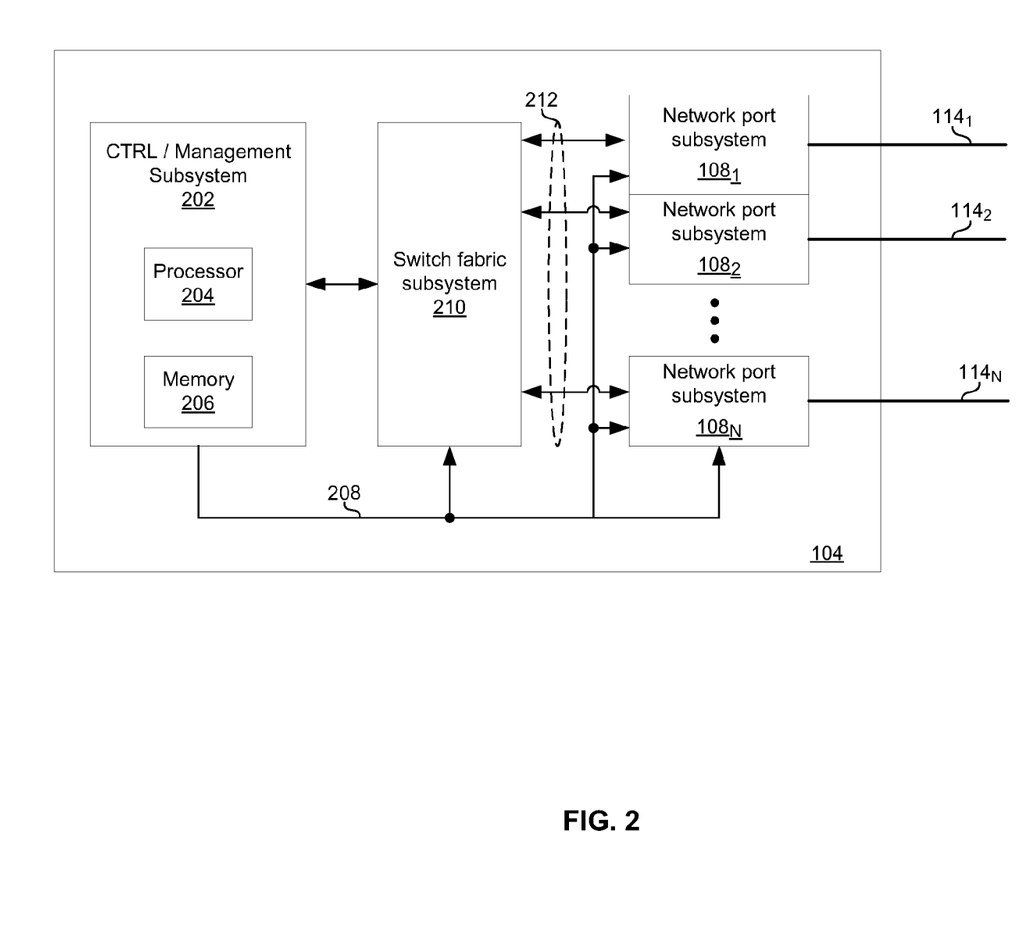
FIG. 2 is a block diagram illustrating an exemplary network device, in accordance with an embodiment of the invention.

FIG. 2 is a block diagram illustrating an exemplary network device, in accordance with an embodiment of the invention. Referring to FIG. 2, the network device 104 may be representative of, for example, a switch, bridge, router, or other device typically found in the interior of a network. The network device 104 may be operable to communicative over a plurality of links $114_1$-$114_N$. The network device 104 may comprise a control and management subsystem 202, a switch fabric subsystem 210, and a plurality of networking port subsystems $108_1$-$108_N$. 'N' may be any integer greater than or equal to 1. For example, the device 104 may be a SMB switch with 'N' equal to 5, an Enterprise switch with 'N' equal to 48, or an aggregation switch with 'N' equal to 96.

The control and management subsystem 202 may comprise suitable logic, circuitry, interfaces, and/or code that may be operable to configure and/or control operations of the network device 104. In this regard, the control and management subsystem 202 may provide one or more control signals 208 to one or more portions of the switch fabric subsystem 210 and/or the network port subsystems $108_1$-$108_N$. Additionally, the control and management subsystem 202 may comprise suitable logic, circuitry, and/or code to enable operability of layer 3, and possibly higher layers, of the OSI model. For example, in instances that the device 104 may be an edge device such as a server or a PC, the control and management subsystem 202 may process data that may be communicated over one or more of the links 216. In an exemplary embodiment of the invention, the control and management subsystem 202 may comprise a processor 204, a memory 206.

The processor 204 may comprise suitable logic, circuitry, interfaces, and/or code that may enable processing data and/or controlling operations of the network device 104. The processor 204 may also enable execution of software code. In various embodiments of the invention, the code may, for example, comprise an operating system and/or other programs performing various functions such as generating, parsing, or otherwise processing data. The processor 204 may be enabled to provide control signals 208 to the various other blocks comprising the network device 104.

The memory 206 may comprise suitable logic, circuitry, and/or code that may enable storage of information. The information may comprise parameters and/or code that may effectuate the operation of the network device 104. The parameters may comprise, for example, information, such as adaptive filter coefficients, for configuring various portions of the network device 104. The code may comprise, for example, an operating system and/or other programs executable by the processor 204. In an embodiment of the invention, the memory 206 may store a look-up table which may associate latency requirements with various traffic characteristics.

The switch fabric subsystem 210 may comprise suitable logic, circuitry, interfaces, and/or code that may be operable to route data between the network port subsystems 108$_1$-108$_N$. Additionally, in some instances, the switch fabric subsystem 210 may be operable to route data between one or more of the network port subsystems 108$_1$-108$_N$ and the control and management subsystem 202.

Each of the network port subsystems 108$_1$-108$_N$ may comprise suitable logic, circuitry, interfaces, and/or code for communicating data between the switch fabric subsystem 202 and the physical links 216$_1$-216$_N$. In this regard, the network port subsystems 108$_1$-108$_N$ may each enable operability of layer 1, and in some instances layer 2 or higher, of the OSI model. The network port subsystems 108$_1$-108$_N$ may comprise, for example, a media access control (MAC) module and a PHY device. Each of the network port subsystems 108$_1$-108$_N$ may comprise, for example, one or more transmitters, receivers, filters, echo cancellation blocks, far-end-crosstalk cancellation blocks, and/or near-end crosstalk cancellation blocks. The network port subsystems 108$_1$-108$_N$ may, for example, communicate with the switch fabric subsystem 210 via an interface 212 which may, for example, be a PCI or PCI-X bus. In an embodiment of the invention, one or more of the of the network port subsystems 108$_1$-108$_N$ may comprise one or more memory elements which a maximum message size associated with that port subsystem, and/or may store a look-up table which may associated latency requirements with various traffic characteristics.

One or more of the network port subsystems 108$_1$-108$_N$ may be operable to communicate in accordance with one or more existing Ethernet physical layer standards such as, for example, 10BASE-T, 100GBASE-TX, 1000BASE-T, 10GBASE-T, 10GBASE-KX4, 10GBASE-KR. One or more of the network port subsystems 108$_1$-108$_N$ may be operable to communicate in accordance with one or more existing future-standardized Ethernet physical layer standards such as, for example, 40GBASE-T, and 100GBASE-T. One or more of the network port subsystems 108$_1$-108$_N$ may be operable to communicate adhering to parts of one or more Ethernet standards but at non-Ethernet-standard rates such as 2.5 Gbps and 5 Gbps. One or more of the network port subsystems 108$_1$-108$_N$ may support multi-lane topologies such as 40 Gbps CR4, ER4, KR4; 100 Gbps CR10, SR10 and/or 10 Gbps LX4 and CX4. One or more of the network port subsystems 108$_1$-108$_N$ may support serial electrical and copper single channel technologies such as KX, KR, SR, LR, LRM, SX, LX, CX, BX10, LX10. One or more of the network port subsystems 108$_1$-108$_N$ may support TDM technologies such as PON at various speeds.

The network device 104 may support suite of protocols collectively known as Audio Video Bridging (AVB) and/or extensions thereof. The individual protocols include, among others, IEEE 802.1AS, IEEE 801.1Qat, and IEEE 802.1Qav. Utilizing AVB, the network device 104 may be operable to allocate resources to particular traffic and/or may be operable to request the allocation of resources for traffic in other devices along a network path. Utilizing AVB, logical link discovery protocol (LLDP), simple network management protocol (SNMP), extensions to any such protocols, and/or any other suitable protocols, the network device 104 may be operable to configure an MTU size in each device along a network path.

Figure 3:
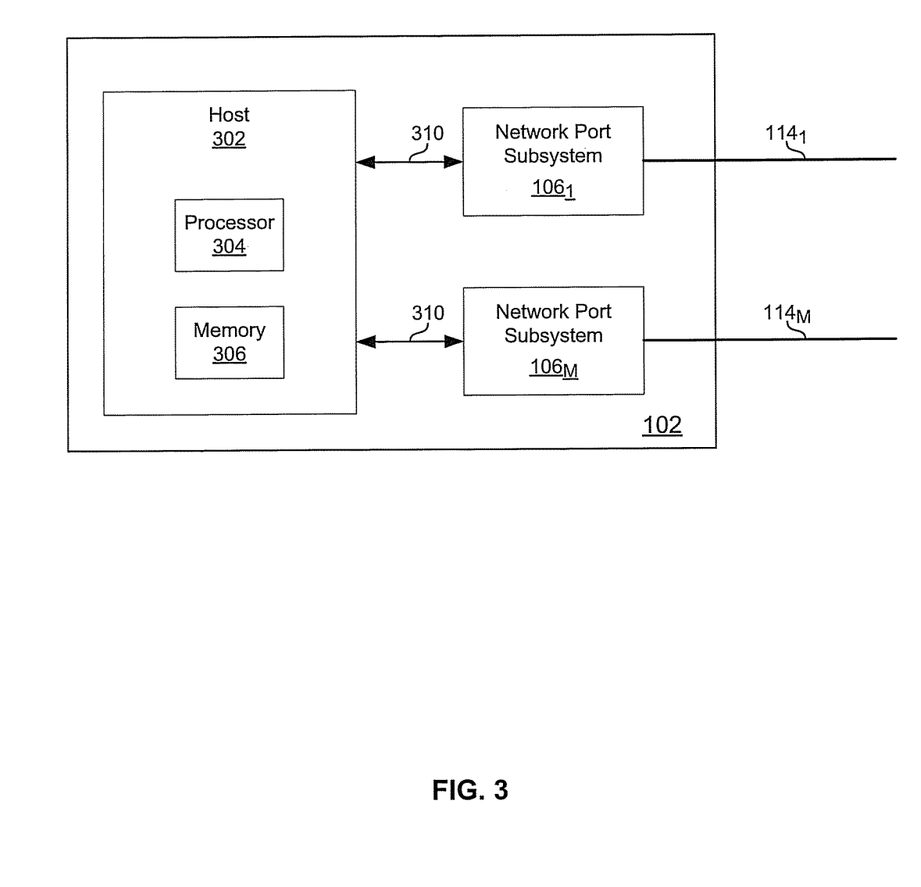
FIG. 3 is a block diagram illustrating an exemplary network device, in accordance with an embodiment of the invention.

FIG. 3 is a block diagram illustrating an exemplary network device, in accordance with an embodiment of the invention. The network device 102 may be representative of, for example, a device at the network edge such as a PC or a server. Referring to FIG. 3, the network device 102 may comprise a host 302 and a one or more network port subsystem 106$_1$-106$_M$. 'M' may be any integer greater than or equal to 1. For example, the device 102 may be a VOIP phone switch with M equal to 3, or a multimedia device with M equal to 1.

The host 302 may comprise suitable logic, circuitry, and/or code that may be operable to enable operability of layer 2 and higher of the OSI model. Additionally, the host 302 may comprise suitable logic, circuitry, and/or code that may be operable to perform any of a variety of computing and/or data processing functions. The host 302 may comprise a processor 304, and a memory 306. The processor 304 and memory 306 may be similar to the processor 204, and a memory 206 described with respect to FIG. 2. The host 302 may perform functions similar to the subsystem 202 of FIG. 2 but may, for example, more typically perform higher-OSI-layer functions such as running applications with which an end-user may interact as compared.

Each of the network port subsystems 106$_1$-106$_M$ may be similar to or the same as one of the network port subsystems 108$_1$-108$_N$ described with respect to FIG. 2. The network port subsystems 106$_1$-106$_M$ may each be operable to communicate over a link 114 which may be the same as one of links 114$_1$-114$_3$ described with respect to FIG. 1. The network port subsystems 106$_1$-106$_M$ may, for example, communicate with the host 302 via an interface 310 which may, for example, be a PCI or PCI-X bus. In an embodiment of the invention, one or more of the of the network port subsystems 106$_1$-106$_M$ may comprise one or more memory elements which a maximum message size associated with that port subsystem, and/or may store a look-up table which may associated latency requirements with various traffic characteristics.

The network device 102 may support suite of protocols collectively known as Audio Video Bridging (AVB) and/or extensions thereof. The individual protocols include, among others, IEEE 802.1AS, IEEE 801.1Qat, and IEEE 802.1Qav. Utilizing AVB, the device 104 may be operable to allocate resources to particular traffic and/or may be operable to request the allocation of resources for traffic in other devices along a network path. Utilizing AVB, LLDP, SNMP, extensions to any such protocols, and/or any other suitable protocols, the network device 104 may be operable to configure an MTU size in each device along a network path.

Figure 4:
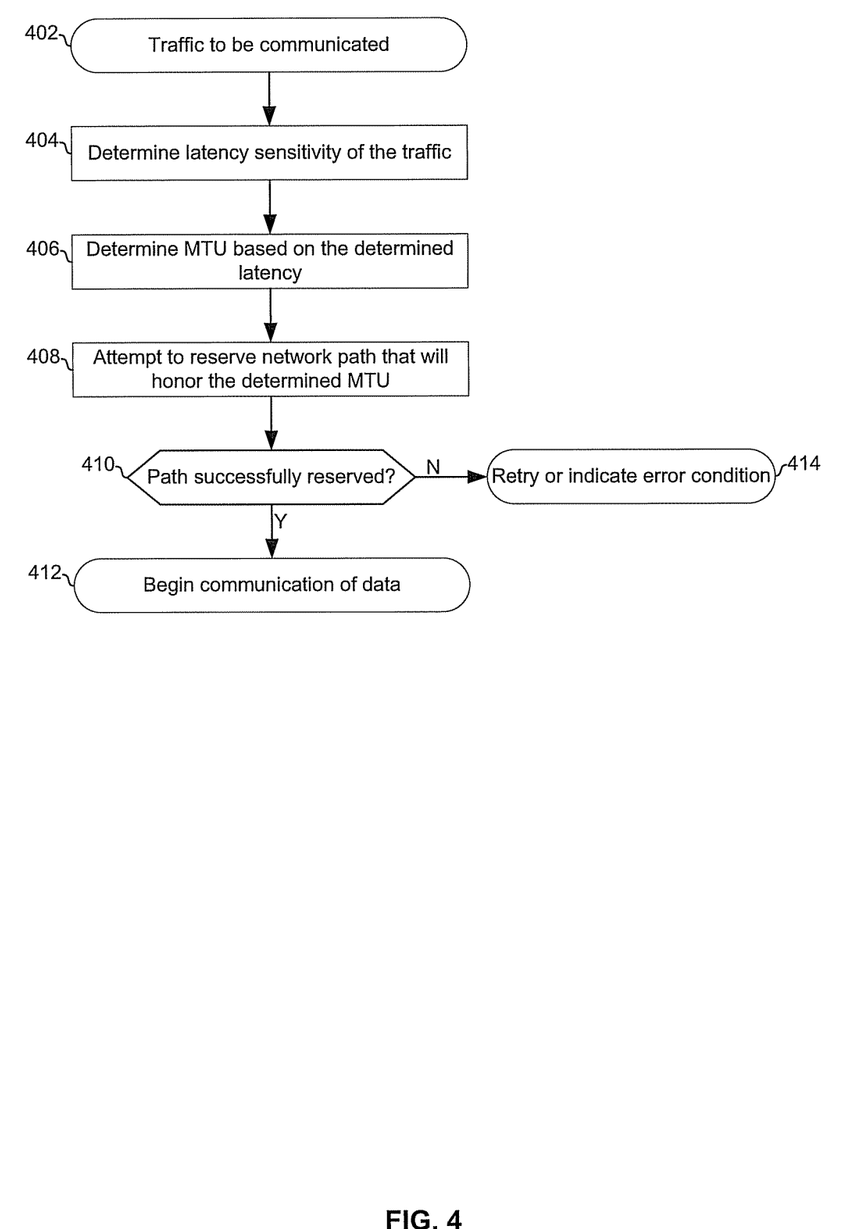
FIG. 4 is a flow chart illustrating exemplary steps for low-latency networking, in accordance with an embodiment of the invention.

FIG. 4 is a flow chart illustrating exemplary steps for low-latency networking, in accordance with an embodiment of the invention. Referring to FIG. 4, the exemplary steps may begin with step 402 in which device $102_1$, has traffic to communicate to a remote network device such as the device $102_2$ or the device $102_3$. In step 404, the device $102_1$ may determine the latency sensitivity of the traffic to be communicated. For example, if the traffic is destined for device $102_2$, the device $102_1$ may determine that the traffic requires low latency. Conversely, if the traffic is destined for device $102_3$, the device $102_1$ may determine that the traffic may be tolerant of higher latency. In step 406, the device $102_1$ may determine a maximum message size corresponding to the determined latency requirements. The device $102_1$ may determine to utilize a first, smaller maximum message size for lower-latency traffic and determine to utilize a second, larger maximum message size for latency-tolerant traffic. In step 408, the device $102_1$ may attempt to reserve resources for the low-latency traffic to be communicated to the device $102_2$. For example, the device $102_1$ may utilize IEEE AVB protocols, and/or extensions thereto, to attempt a reservation of sufficient resources along the path 112 to meet the determined latency requirements.

In step 410, it may be determined whether path 112 was successfully established. For example, as part of this reservation, or attempted reservation, devices along the path 112 may reply to the reservation request from device $102_1$ acknowledging the request to utilize the first maximum message size on the path 112 and indicating whether they can comply with the request. In instances that no acknowledgments of the requests are received and/or that the devices 104 and/or $102_2$ respond indicating that there are insufficient resources available, then in step 214, the device $102_1$ may try again and/or indicate a connection failure. In instances that the reservation is successful and the devices 104 and $102_2$ agree to comply with the determined maximum message size, then, in step 412, communication of the traffic to the device $102_2$ may begin.

Figure 5:
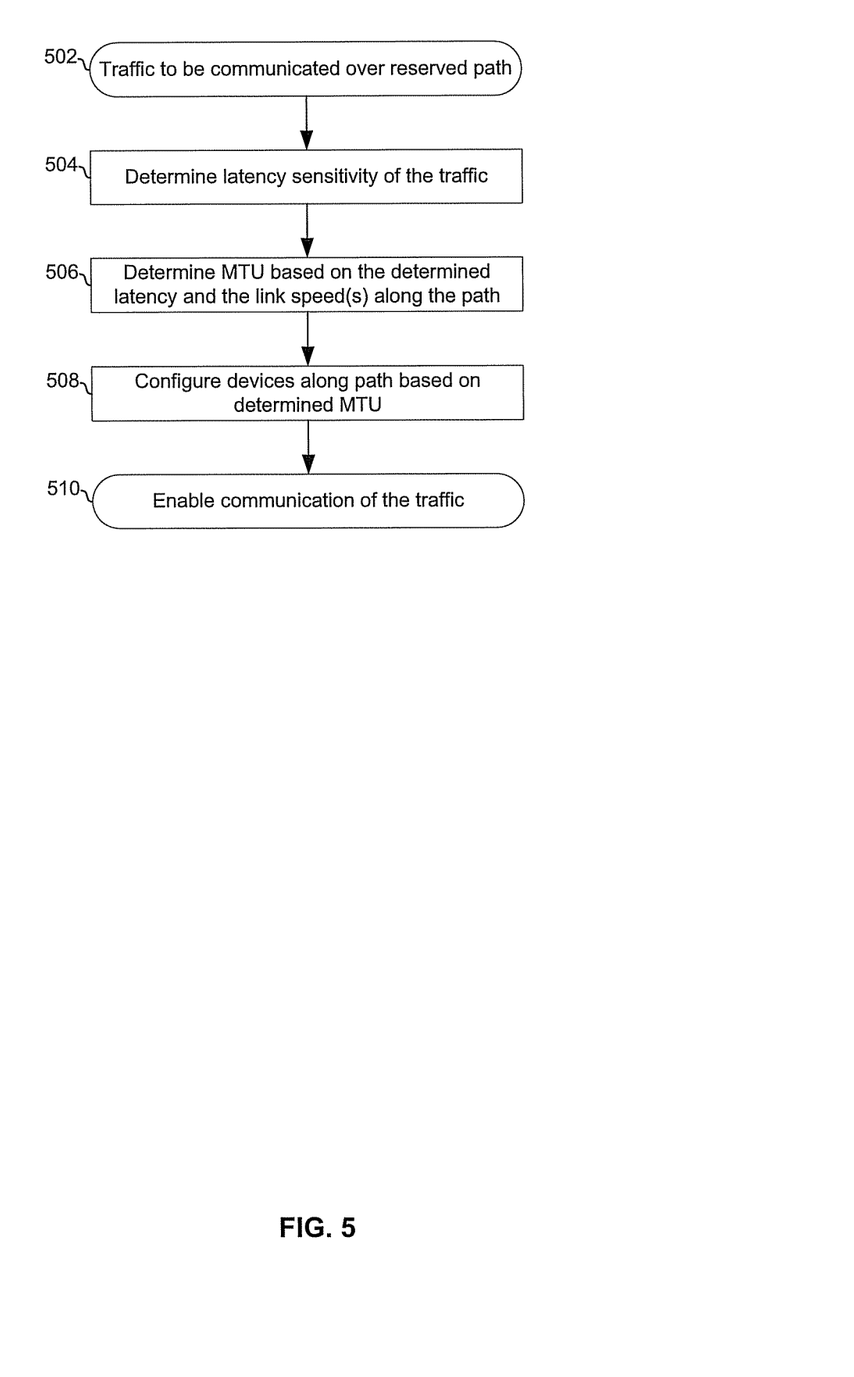
FIG. 5 is a flow chart illustrating exemplary steps for low-latency networking, in accordance with an embodiment of the invention.

FIG. 5 is a flow chart illustrating exemplary steps for low-latency networking, in accordance with an embodiment of the invention. Referring to FIG. 5, the exemplary steps may begin with step 502 when the device $102_1$ has traffic to communicate over a reserved network path, such as the path 112 or the path 110. In step 504, the device $102_1$ may determine the latency sensitivity of the traffic to be communicated. For example, if the traffic pertains to vehicle control and/or safety systems, the device $102_1$ may determine that the traffic requires low latency. Conversely, if the traffic is for entertainment purposes, the device $102_1$ may determine that the traffic may be tolerant of higher latency. In step 506, the device $102_1$ may determine a maximum message size for communicating the traffic based on the latency requirements determined in step 504 and based on the resources available along the network path. For example, if all links along the path are high-speed, then a larger maximum message size may be utilized whereas a smaller maximum message size may be necessary if one or more links along the path are lower speed.

In step 508, the determined maximum message size may be communicated to the devices along the network path. Upon receiving this information, each device along the path may configure itself to adhere to the determined maximum message size for communications on the path. Each device may acknowledge this configuration by sending a response to the device $102_1$. In step 510, the device $102_1$ may begin communicating the traffic onto the network path.

Figure 6:
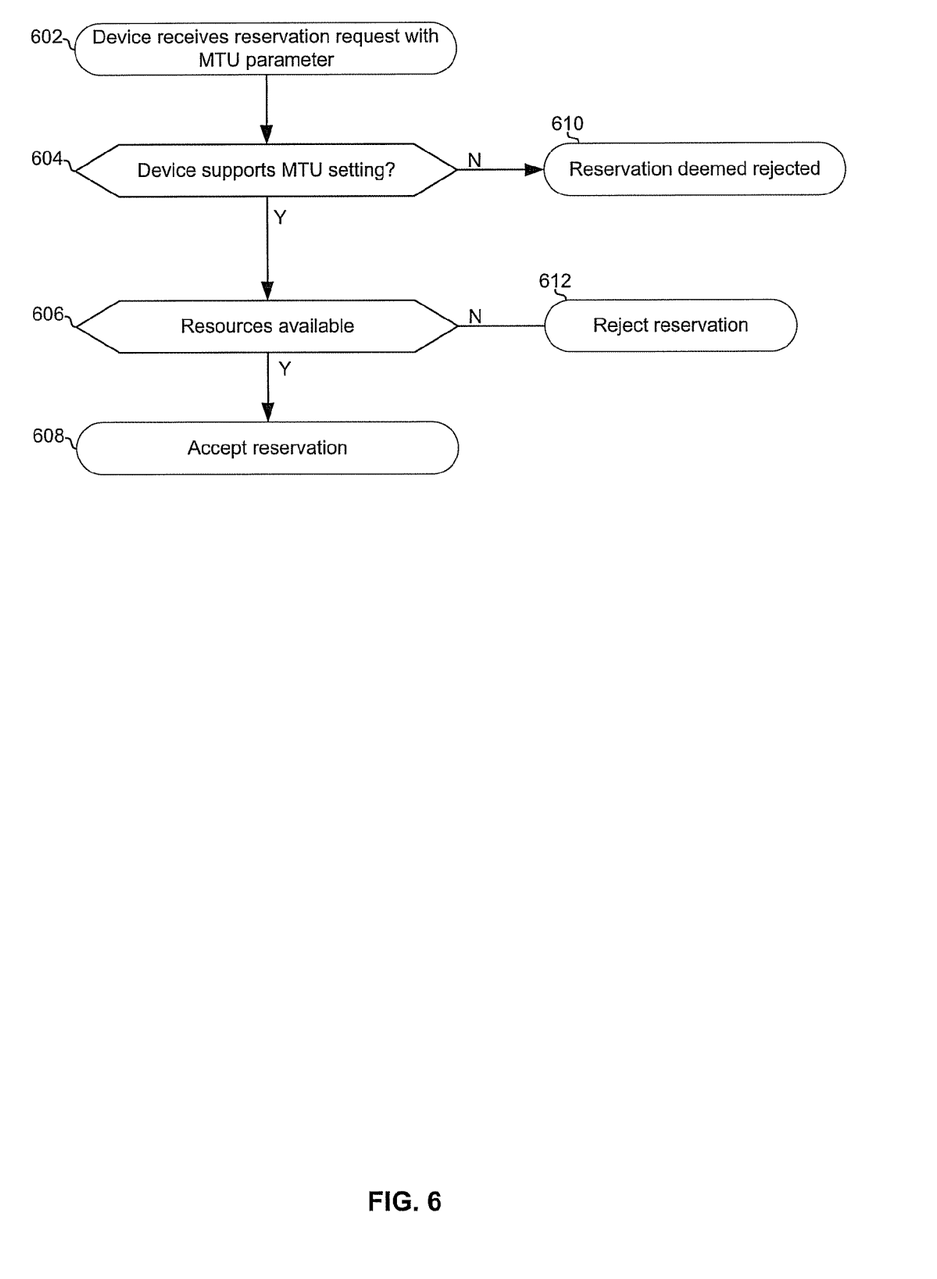
FIG. 6 is a flow chart illustrating exemplary steps for low-latency networking, in accordance with an embodiment of the invention.

FIG. 6 is a flow chart illustrating exemplary steps for low-latency networking, in accordance with an embodiment of the invention. Referring to FIG. 6, the exemplary steps may begin with step 602 in which the device 104 receives a determined maximum message size and a request to utilize the determined maximum message size for communications on a particular network path. In step 604, if the device 104 does not support per-path and/or per-link maximum message size, then the exemplary steps may advance to step 610, and the device 104's failure to acknowledge the request may be deemed as a rejection of the request. Returning to step 604, if the device 104 does support per-path or per-link maximum message size, then the exemplary steps may advance from step 606. In step 606, if the device 104 does not have sufficient available resources to meet the reservation request, then in step 612, the device 104 may reject the reservation request. Returning to step 606, if the device 104 does have sufficient available resources to meet the reservation request, then in step 608, the device 104 may reserve the resources per the request, acknowledge the reservation, and ready itself to begin receiving and forwarding the traffic.

Various aspects of a method and system for low-latency networking are provided. In an exemplary embodiment of the invention, latency requirements of traffic to be communicated along a network path 112 comprising one or more Ethernet links 114 may be determined. A maximum size of Ethernet frames utilized for communicating the traffic may be determined based on the latency requirements. One or more messages indicating the determined maximum size may be communicated to devices along the network path 112. The maximum size of the Ethernet frames may be determined based on a data rate of one or more Ethernet links 114 along the network path 112. The maximum size of the Ethernet frames may be determined to be a first, smaller value when the traffic pertains to automobile control and/or safety systems. The maximum size of the Ethernet frames may be determined to be a second, higher value when the traffic is non-critical; for example, when it does not pertain to vehicle control or safety systems. The network device $102_1$ may begin communicating the traffic upon receiving an indication that each of the devices 104 and $102_2$ along the network path 112 will adhere to the determined maximum Ethernet frame size for communications on the network path 112. The network device $102_1$ may communicate with the devices $102_2$ and 104 along the network path 112 to reserve resources for communicating the traffic along the network path 112 in Ethernet frames of the determined maximum size.

In various embodiments of the invention, a network device 104 may receive an indication of a determined maximum Ethernet frame size to be utilized on a particular network path such as path 112. One or more portions of the network device 104 may be configured such that the network device 104 adheres to the determined maximum Ethernet frame size when transmitting on the network path 112, but the device 104 may utilize other maximum message sizes on other paths and/or links. The network device 104 may packetize traffic to be communicated on the network path 112 into Ethernet frames of less than or equal to the determined maximum Ethernet frame size. The network device 104 may send one or more messages indicating that it will adhere to the determined maximum Ethernet frame size when communicating on the network path 112. The determined maximum Ethernet frame size may be based on latency requirements of traffic to be communicated on the network path 112. The maximum size of the Ethernet frames may be based on a data rate associated with one or more links 114 of the network path.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for low latency networking.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
  retrieving from memory in a network device a characteristic of message traffic to be transmitted, and determining with circuitry a traffic latency requirement of traffic to be communicated along a network path comprising an Ethernet link, the traffic latency requirement being a maximum delivery delay time through the network path for delivery of the message traffic;
  determining based on the traffic latency requirement a maximum Ethernet frame size for the traffic;
  reserving with the circuitry a network resource in at least one of a plurality of other network devices along said network path for said maximum Ethernet frame size of said traffic to be communicated by said network device to said at least one of said plurality of other network devices along said network path, said reserving being based on the traffic latency requirement and includes sending a reservation request and receiving an acknowledgment from the at least one of the plurality of other network devices along said network path that the at least one of the plurality of other network devices can comply with the maximum Ethernet frame size of the traffic; and
  transmitting one or more messages indicating said maximum Ethernet frame size to said plurality of other network devices along said network path.

2. The method according to claim 1, determining, by said network device, said maximum Ethernet frame size based on a data rate supported by said network path.

3. The method according to claim 1, wherein said determining a maximum Ethernet frame size includes:
  determining, by said network device, said maximum Ethernet frame size to be a first, smaller value in response to said traffic being associated with an automobile control system, an automobile safety system, or any combination thereof; and
  determining, by said network device, said maximum Ethernet frame size to be a second, higher size otherwise.

4. The method according to claim 1, wherein said determining a maximum Ethernet frame size includes:
  determining, by said network device, said maximum Ethernet frame size to be a first, smaller value when said traffic controls automated factory equipment; and
  determining, by said network device, said maximum Ethernet frame size to be a second, higher value otherwise.

5. The method according to claim 1, wherein said network device begins communicating said traffic upon receiving an indication that each of said at least one of said plurality of other devices along said network path will adhere to said determined maximum Ethernet frame size when communicating on said network path.

6. A method comprising:
  receiving with circuitry an indication of a maximum Ethernet frame size to be used in communicating message traffic from a source device over a network path, the source device having determined based on the traffic latency requirement the maximum Ethernet frame size for the message traffic, the traffic latency requirement being a maximum delivery delay time through the network path for delivery of the message traffic;
  reserving with the circuitry network resources in one or more portions of said network device such that said network device adheres to said maximum Ethernet frame size when transmitting on said network path, said network resources reserved to verify said network device is capable of receipt of traffic of said maximum Ethernet frame size along the network path, said reserving including sending a reservation request and receiving an acknowledgement from network devices along said network path that the network devices along said network path can comply with the maximum Ethernet frame size; and
  sending at least one message indicating that said network device will adhere to said maximum Ethernet frame size when communicating said traffic on said network path.

7. The method according to claim 6, further comprising:
  packetizing the traffic to be communicated on said network path into a plurality of Ethernet frames of a size that is less than or equal to said maximum Ethernet frame size.

8. The method according to claim 7, wherein said maximum Ethernet frame size is based on a lowest link speed along said network path.

9. The method according to claim 6, wherein said network resource is allocated utilizing an Audio Video Bridging (AVB) protocol.

10. A system comprising:
  circuitry configured to
    retrieve from memory a characteristic of message traffic to be transmitted along a network path comprising an Ethernet link and determine a traffic latency requirement of the message traffic, the traffic latency requirement being a maximum delivery delay time through the network path for delivery of the message traffic;

determining based on the traffic latency requirement a maximum Ethernet frame size for the traffic;

reserve a network resource in other devices along said network path for said maximum Ethernet frame size of the message traffic to be communicated to said other devices along said network path, said network resource having confirmed being capable of receipt of the maximum Ethernet frame size along the network path, wherein the circuitry sends a reservation request and receives acknowledgements from the plurality of other network devices along said network path that the plurality of other network devices can comply with the maximum Ethernet frame size of the message traffic; and transmit one or more messages indicating said maximum Ethernet frame size to said other network devices along said network path.

11. The system according to claim 10, wherein said circuitry being configured to determine said maximum Ethernet frame size of said message traffic based on a data rate supported by said network path.

12. The system according to claim 10, wherein said circuitry configured to:

determine, by said network device, said maximum Ethernet frame size of the message traffic to be a first, smaller value when said message traffic is associated with an automobile control system, an automobile safety system, or any combination thereof; and determine, by said network device, said maximum Ethernet frame size of the message traffic to be a second, higher value otherwise.

13. The system according to claim 10, wherein said circuitry configured to:

determine, by said network device, said maximum Ethernet frame size of the message traffic to be a first, smaller value when said message traffic controls automated factory equipment; and determine, by said network device, said maximum Ethernet frame size of the message traffic to be a second, higher value otherwise.

14. The system according to claim 10, wherein said network resource is allocated utilizing an Audio Video Bridging (AVB) protocol.

15. A non-transitory computer-readable medium embodying a program executable in at least one network device, the program comprising code that when executed by a processor circuitry causes the processor circuitry to:

retrieve from memory a characteristic of message traffic to be transmitted and determines a traffic latency requirement of traffic to be communicated along a network path comprising an Ethernet link, the traffic latency requirement being a maximum delivery delay time through the network path for delivery of the message traffic;

determine based on the traffic latency requirement a maximum Ethernet frame size for said message traffic;

reserve a network resource in other devices along said network path to reserve said network resource for said maximum Ethernet frame size of message traffic to be communicated to said other devices along said network path, said network resource in said other devices having confirmed being capable of receipt of said of the maximum Ethernet frame size along the network path, wherein the circuitry sends a reservation request and receives acknowledgements from the plurality of other network devices along said network path that the plurality of other network devices can comply with the maximum Ethernet frame size of the message traffic; and transmits one or more messages indicating said maximum Ethernet frame size to said other devices along said network path.

16. The non-transitory computer-readable medium of claim 15, the program further comprising code that when executed by the processor circuitry transmits a message indicating that the network device will adhere to the maximum Ethernet frame size when communicating message traffic on the network path.

17. The non-transitory computer-readable medium of claim 15, wherein the maximum Ethernet frame size is based on a lowest link speed along the network path.

* * * * *